United States Patent [19]

Miese et al.

[11] Patent Number: 5,018,961
[45] Date of Patent: May 28, 1991

[54] HYDRAULIC CLOSING UNIT

[75] Inventors: Manfred Miese, Ettlingen; Ernst Mai, Riesweiler, both of Fed. Rep. of Germany

[73] Assignee: Battenfeld GmbH, Fed. Rep. of Germany

[21] Appl. No.: 525,102

[22] Filed: May 17, 1990

[30] Foreign Application Priority Data

May 18, 1989 [DE] Fed. Rep. of Germany ....... 3916193

[51] Int. Cl.$^5$ .............................................. B29C 45/67
[52] U.S. Cl. .............................. 425/450.1; 100/269 R;
100/269 B; 100/273; 425/810
[58] Field of Search ......................... 425/450.1, 451.2;
100/269 R, 269 B, 273

[56] References Cited

U.S. PATENT DOCUMENTS

| | | | |
|---|---|---|---|
| 3,677,685 | 7/1972 | Aoki | 425/451.2 |
| 3,697,212 | 10/1972 | Herbst | 425/451.2 |
| 4,565,116 | 1/1986 | Hehl | 425/451.2 |
| 4,599,063 | 7/1986 | Gutjahr | 425/451.2 |
| 4,636,167 | 1/1987 | Shibata | 425/450.1 |
| 4,890,998 | 1/1990 | Gräbener et al. | 425/450.1 |

FOREIGN PATENT DOCUMENTS 2019883 2/1975 Fed. Rep. of Germany .
1275850 10/1961 France .

*Primary Examiner*—Willard E. Hoag
*Attorney, Agent, or Firm*—Toren, McGeady & Associates

[57] ABSTRACT

A hydraulic closing unit, particularly for injection molding machines which process plastics material. The closing unit includes a mold clamping plate which is slidably guided on guide columns between a stationary support plate and a stationary mold clamping plate. An annular main piston acts on the slidable mold clamping plate with a high mold closing force in mold closing direction. The main piston is axially slidably guided in the stationary support plate and load can be applied to both sides of the main piston. At least two coupling planes are provided between the main piston and the central pressure column. The coupling planes are mounted spaced apart and one behind the other in sliding direction of the slidable mold clamping plate. The main piston and the pressure column are slidable relative to each other over the distance range between the coupling planes. Coupling elements of the main piston and of the pressure column can be placed in and out of supporting engagement only in the region of each coupling plane.

5 Claims, 2 Drawing Sheets

HYDRAULIC CLOSING UNIT

BACKGROUND OF THE INVENTION

1. Field of the Invention

The present invention relates to a hydraulic closing unit, particularly for injection molding machines which process plastic material. The closing unit includes a mold clamping plate which is slidably guided on guide columns between a stationary support plate and a stationary mold clamping plate. An annular main piston acts on the slidable mold clamping plate with a high mold closing force in mold closing direction. The main piston is axially slidably guided in the stationary support plate and load can be applied to both sides of the main piston. A mechanical support means acts on the main piston between the main piston and a mechanical pressure connection acting on the mechanical support means through a central pressure column.

2. Description of the Related Art

A hydraulic closing unit of the above-described type is known from German Auslegeschrift 20 19 883.

The known closing unit is constructed to be capable of carrying out with separate means the different operations, namely the closing operation, the opening operation and the sliding operation, wherein the sequence of operations is accelerated. On the other hand, the known closing unit makes it possible to carry out a hydraulic mold level compensation with a rigid guidance of the movable mold clamping plate.

However, the known closing unit has the disadvantage that the possible mold level compensation is determined by the available maximum moving distance of the annular piston minus the moving distance required for closing and opening the mold. Accordingly, in the known closing unit, the maximum moving distance of the annular piston must be dimensioned substantially greater than the moving distance required for opening and closing the mold.

French patent No. 1,275,850 discloses a hydraulic closing unit in which the work position of the cylinder for generating the mold closing force can be obtained mechanically. However, also in this case, the possible adjustment range is basically dependent upon the maximum effective operating length of the cylinder, wherein this length again must be dimensioned greater than the adjusting distance required for opening and closing the mold.

SUMMARY OF THE INVENTION

It is, therefore, the primary object of the present invention to provide a hydraulic closing unit of the above-described type in which the main cylinder only has to have a structural length which corresponds to the stroke distance of the main piston required for opening and closing the mold, while still making it possible to adjust the mounting level or height for the molds to be used, wherein the adjustment distance substantially exceeds the available stroke distance of the main piston.

In accordance with the present invention, at least two mechanical stop planes and/or coupling planes are provided between the main piston and the central pressure column. The stop planes and/or coupling planes are arranged spaced apart and one behind the other in adjusting direction of the slidable mold clamping plate. The main piston and the pressure column are slidable relative to each other over the distance range between the coupling planes. Coupling elements of the main piston and the pressure column can be placed in and out of supporting engagement only in the region of each coupling plane.

Since the main piston of the closing unit has an annular shape and, thus, the pressure column can be axially displaced within the annular space relative to the main piston practically over the entire available length, a relatively large adjusting range for the mounting level is available even when the cylinder is designed for relatively short displacements of the main piston.

In accordance with a further development of the invention, the coupling elements include coupling engagement or support surfaces directed transversely of the adjusting direction of the displaceable mold clamping plate. The coupling engagement or support surfaces can be placed in and out of supporting engagement by a relative rotation about the common longitudinal axis of main piston and pressure column.

As a result, only a very small space is required for mounting the coupling elements between the annular main piston and the pressure column.

In accordance with another advantageous feature of the invention, the coupling elements are a spline coupling sleeve and spline coupling head which are arranged so as to be rotatable relative to each other by at least half a spacing between the keys or keyways. For example, in spline coupling sleeves and spline coupling heads each having eight keys or keyways arranged distributed over the circumference, a rotation of only 22° 30' is required for placing the coupling elements in and out of engagement.

In accordance with another particularly useful feature of the invention, the spline coupling sleeve is arranged within the annular main piston and includes a particular group of keys for each stop plane or coupling plane, while the spline coupling head is mounted on that end of the pressure column which faces the main piston and is supported so as to be rotatable relative to the pressure column.

In accordance with another advantageous feature, both coupling elements can be placed in engagement with each other in each coupling plane by means of pressure force transmission surfaces as well as by means of tensile force transmission surfaces. As a result, it is possible to apply to the slidable mold clamping plate not only a high mold closing force but also a correspondingly high mold opening force.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
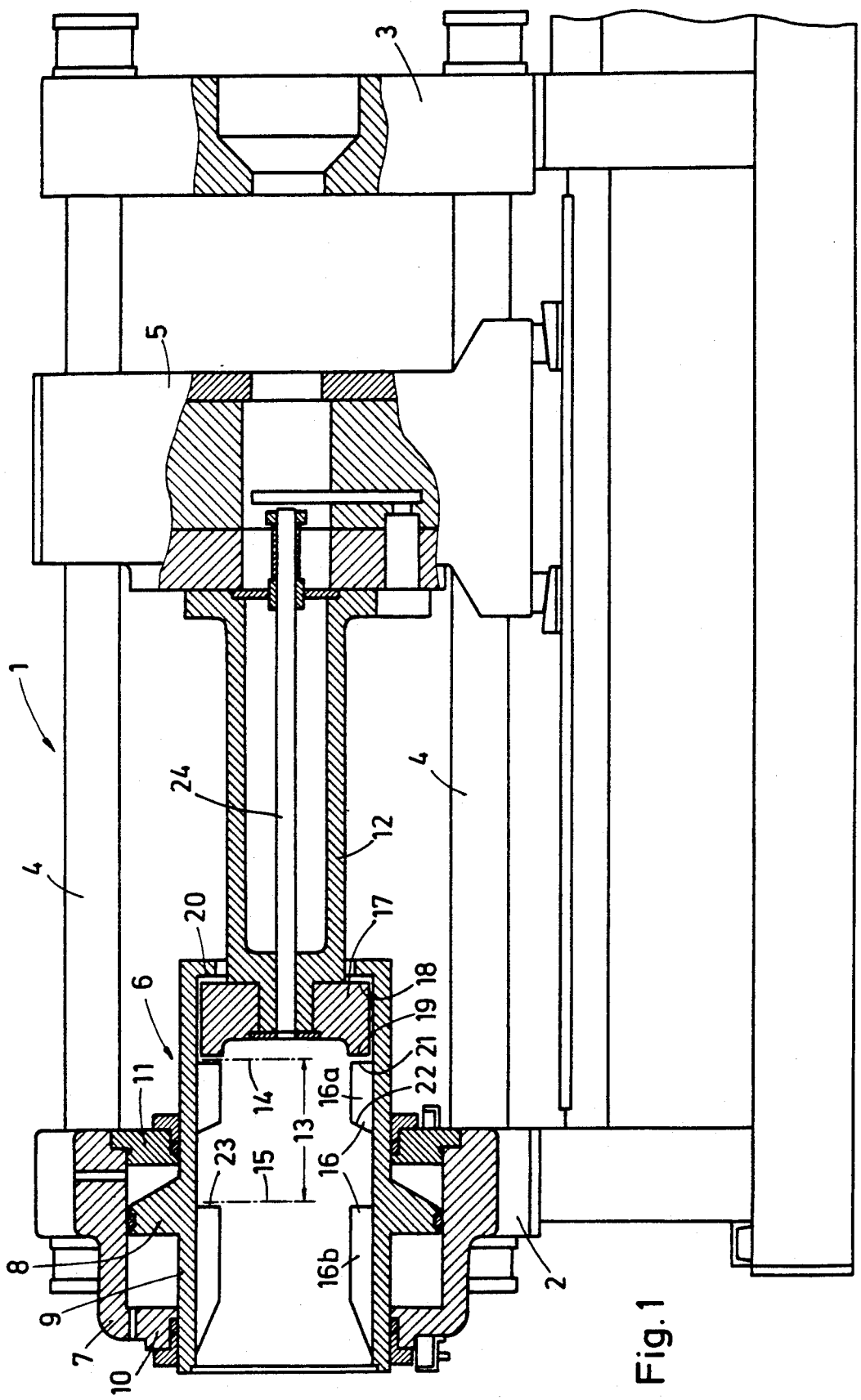
FIG. 1 is a sectional view in longitudinal direction of the hydraulic closing unit according to the present invention.

As illustrated in the drawing, the closing unit 1 according to the present invention includes a stationary support plate 2, an also stationary mold clamping plate 3 and four guide columns 4 which rigidly connect the spaced-apart support plate 2 and the mold clamping plate 3.

A slidable mold clamping plate 5 is also mounted on the guide columns 4. The slidable mold clamping plate 5 can be moved toward and away from the stationary mold clamping plate 3 by means of a hydraulic drive 6.

The hydraulic drive 6 includes a cylinder 7 which is mounted in the stationary support plate 2. A main piston 8 through which a pressure medium can be applied on both sides is displaceably arranged in the cylinder 7.

The main piston 8 has an annular shape and is integrally formed with a tubular piston rod which, in turn, is slidably guided in the two end walls 10 and 11 of cylinder 7.

The stroke distance of the main piston 8 in cylinder 7 is relatively short, so that this stroke distance practically only corresponds to the opening and closing distance for the injection mold, not shown, to be mounted between the stationary mold clamping plate 3 and the slidable mold clamping plate 5.

The main piston 8 of the hydraulic drive 6 interacts with the slidable mold clamping plate 5 through a central pressure column 12 which is mounted in axial alignment with the main piston 8 of the hydraulic drive 6.

Important components of the operative connection between the main piston 8 and the pressure column 12 are at least two mechanical stop planes and/or coupling planes 14 and 15 which are spaced apart by a distance 13 and are located one behind the other in sliding direction of the slidable mold clamping plate 5. The main piston 8 and the pressure column 12 are slidable relative to each other over the distance 13 between the planes 14 and 15. In addition, it is important that the pressure column 12 can be placed in and out of supporting engagement with the main piston 8 only in the region of each of the two coupling planes 14 and 15.

The pressure column 12 and the main piston 8 are coupled to each other in the region of the forward coupling plane 14 when the distance between the stationary mold clamping plate 3 and the slidable mold clamping plate 5 is to be preadjusted for an injection mold having a relatively small or minimum structural height. On the other hand, the pressure column 12 and the main piston 8 are coupled in the region of the rearward coupling plane 15 when the distance between the stationary mold clamping plate 3 and the slidable mold clamping plate 5 is to be preadjusted to a large or maximum structural height for an injection molding tool.

Coupling elements in the form of a spline coupling sleeve 16 and a spline coupling head 17 are provided between the tubular piston rod 9 of the main piston 8 and the pressure column 12.

The spline coupling sleeve is mounted within the tubular piston rod 9 of the annular main piston 8 and has a separate key group 16a and 16b for each stop plane or coupling plane 14, 15. The spline coupling head 17 is mounted on the end of the pressure column 12 which faces the main piston 8 and is supported so as to be rotatable relative to the spline coupling sleeve.

The spline coupling head 17 has at one end thereof tensile force transmission surfaces 18 and the other end has compression force transmission surfaces 19. In the region of the coupling plane 14, the spline coupling sleeve 16 or the tubular piston rod 9 has tensile force transmission surfaces 20 and compression force transmission surfaces 22, while similarly, in the region of the coupling plane 15, tensile force transmission surfaces 22 and compression force transmission surfaces 23 are provided.

All tensile force transmission surfaces 18, 20 and 22 and all compression force transmission surfaces 19, 21 and 23 are constructed as coupling engagement surfaces or coupling supporting surfaces which extend essentially transversely to the sliding direction of the slidable mold clamping plate 5 and which can be placed in an out of supporting engagement by a relative rotation of the spline coupling head 17 to the spline coupling sleeve 16 about the common longitudinal axis of main piston 8 and pressure column 12. A shaft 24 is used for turning the spline coupling head 17 relative to the spline coupling sleeve 16. The shaft 24 extends coaxially through the pressure column 12 and can be actuated in the region of the slidable mold clamping plate 5, for example, by means of a handle.

For alternatingly engaging and disengaging the spline coupling head 17 relative to the spline coupling sleeve 16 in the region of the two stop or coupling planes 14 and 15, it is only necessary to turn the coupling head 17 to an extent which corresponds to half a spacing provided between the keys and keyways which are provided in complementary arrangement on the outer circumference of the spline coupling head 17 and on the inner circumference of the spline coupling sleeve 16.

Figure 2:
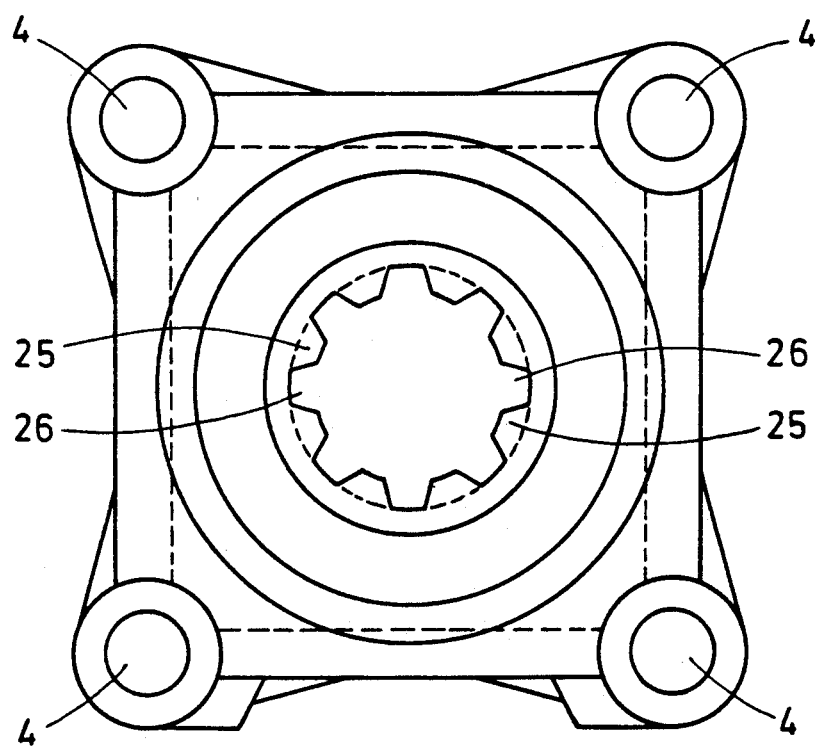
FIG. 2 is a front view of the side of the closing unit which includes the piston.

FIG. 2 of the drawing shows an example of the keys 25 and 30 and the keyways 26 which are provided on the inner circumference of the spline coupling sleeve 16 within the tubular piston rod 9 of the main piston 8. Of course, the spline coupling head 17 has complementary keys and keyways on its outer circumference.

As shown in FIG. 2, the spline coupling sleeve has eight alternating keys 25 and keyways 26 which are distributed in circumferential direction. As a result, a rotation of the spline coupling head 17 relative to the spline coupling sleeve 16 of only 22° 30' is sufficient to engage and disengage the coupling connection between the pressure column 12 and the main piston 8 in the two coupling planes 14 and 15. In the engaged position, the keys of the spline coupling sleeve 16 and the spline coupling head 17 extend with their tensile force transmission surfaces 18 and 20 or 18 and 22 and with their compression force transmission surfaces 19 and 21 or 19 and 23 essentially transversely to the direction of displacement of the slidable mold clamping plate 5 to obtain a mutual supporting engagement. In the disengaged position, the keys of the spline coupling head 17 are located in the region of the keyways of the spline coupling sleeve 16 and vice versa. In the latter case, a relative axial displacement of pressure column 12 and main piston 8 over the distance 13 is easily possible between the two coupling planes 14 and 15.

Finally, it should be noted that the invention is not limited to the presence of only two stop or coupling planes 14 and 15 between the guide column 4 and the main piston 8 of the hydraulic drive 6; rather, if necessary, more than two stop or coupling planes can be provided. It is merely required that in each case of the mounting level adjustment between the mold clamping plates 3 and 5, the available stroke distance of the main piston 8 in the cylinder 7 of the hydraulic drive 6 is fully maintained for opening and closing the injection mold.

While a specific embodiment of the invention has been shown and described in detail to illustrate the application of the inventive principles, it will be understood that the invention may be embodied otherwise without departing from such principles.

We claim:

1. In a hydraulic mold closing unit, for an injection molding machines, the closing unit including a stationary support plate and a stationary mold clamping plate and guide columns extending between the stationary support plate and the stationary mold clamping plate, and a slidable mold clamping plate slidably guided on the guide columns between the stationary support plate and the stationary mold clamping plate, an annular main piston being axially slidably guided in the stationary support plate, means for applying load to both sides of the main piston, the main piston being capable of acting on the slidable mold clamping plate with a high mold closing force in mold closing direction, a mechanical support means and a mechanical pressure connection, the mechanical support means being capable of acting on the main piston between the main piston and the mechanical pressure connection, the mechanical pressure connection acting on the mechanical support means through a central pressure column, the improvement comprising at least two coupling planes provided between the main piston and the central pressure column, the coupling planes being mounted spaced apart and one behind the other in sliding direction of the slidable mold clamping plate, the main piston and the pressure column being slidable relative to each other over a distance range existing between the coupling planes, and coupling elements of the piston and said central pressure column being movable in and out of supporting engagement in a region of the coupling plane by means of the main piston and the pressure column.

2. The closing unit according to claim 1, wherein the coupling elements comprise coupling engagement and support surfaces directed transversely of the sliding direction of the displaceable mold clamping plate, the main piston and the pressure column having a common longitudinal axis, the coupling engagement and support surfaces being movable in and out of supporting engagement by a relative rotation about the common longitudinal axis of the main piston and the pressure column.

3. The closing unit according to claim 2, wherein the coupling elements comprise a spline coupling sleeve and a spline coupling head each having spaced-apart keys and keyways, the spline coupling sleeve and the spline coupling head being mounted so as to be rotatable relative to each other by at least half a spacing between the keys and keyways.

4. The closing unit according to claim 3, wherein the spline coupling sleeve is mounted within the annular main piston and has a group of keys for each coupling plane, and wherein the spline coupling head is mounted on an end of the pressure column which faces the main piston and is supported so as to be rotatable relative to the pressure column.

5. The closing unit according to claim 4, wherein the spline coupling sleeve and the spline coupling head each have pressure force transmission surfaces and tensile force transmission surfaces, the spline coupling sleeve and the spline coupling head being engageable in each coupling plane by means of the pressure force transmission surfaces and by means of the tensile force transmission surface.

* * * * *